(12) United States Patent
Imura

(10) Patent No.: US 8,637,797 B2
(45) Date of Patent: Jan. 28, 2014

(54) RADIO FREQUENCY IDENTIFICATION CONTROLLED HEATABLE OBJECTS

(76) Inventor: Mamoru Imura, Overland Park, KS (US)

( * ) Notice: Subject to any disclaimer, the term of this patent is extended or adjusted under 35 U.S.C. 154(b) by 722 days.

(21) Appl. No.: 11/617,407

(22) Filed: Dec. 28, 2006

(65) Prior Publication Data

US 2007/0257028 A1 Nov. 8, 2007

Related U.S. Application Data

(63) Continuation of application No. 10/833,356, filed on Apr. 28, 2004, now Pat. No. 7,157,675.

(51) Int. Cl.
*H05B 6/12* (2006.01)

(52) U.S. Cl.
USPC ............................ 219/627; 219/620; 219/621

(58) Field of Classification Search
USPC ......... 219/618, 494, 495, 490, 667, 710, 713, 219/714, 702, 619–627
See application file for complete search history.

(56) References Cited

U.S. PATENT DOCUMENTS

| | | | |
|---|---|---|---|
| 5,441,344 A | 8/1995 | Cook, III | |
| 6,206,564 B1 | 3/2001 | Adamczewski | |
| 6,316,753 B2 * | 11/2001 | Clothier et al. | 219/621 |
| 6,320,169 B1 | 11/2001 | Clothier | |
| 6,444,961 B2 * | 9/2002 | Clothier et al. | 219/622 |
| 6,501,057 B1 * | 12/2002 | Jarvis | 219/621 |
| 6,953,919 B2 * | 10/2005 | Clothier | 219/620 |
| 2003/0106889 A1 * | 6/2003 | Owens et al. | 219/601 |
| 2004/0016348 A1 * | 1/2004 | Sharpe | 99/331 |

* cited by examiner

*Primary Examiner* — Brian Jennison
(74) *Attorney, Agent, or Firm* — Kutak Rock LLP; Bryan P. Stanley

(57) ABSTRACT

A temperature controlled heatable object is provided in which a temperature sensor is connected to a Radio Frequency Identification (RFID) tag. The RFID tag is located within the handle of the object, and the temperature sensor is placed in contact with the object. In a first embodiment of the invention, the temperature sensor is partially imbedded within the object via a notch located in the side of the object. In a second embodiment of the invention, a temperature sensor is imbedded within a tunnel drilled within the base of the object. In a third embodiment, a temperature sensor is imbedded between the bottom of the object and a slab attached to the bottom of the object. The sensor can be located in a slot formed in either the slab or the bottom or the object. Handles and receivers for mounting the handles to the temperature controllable objects are also provided.

19 Claims, 14 Drawing Sheets

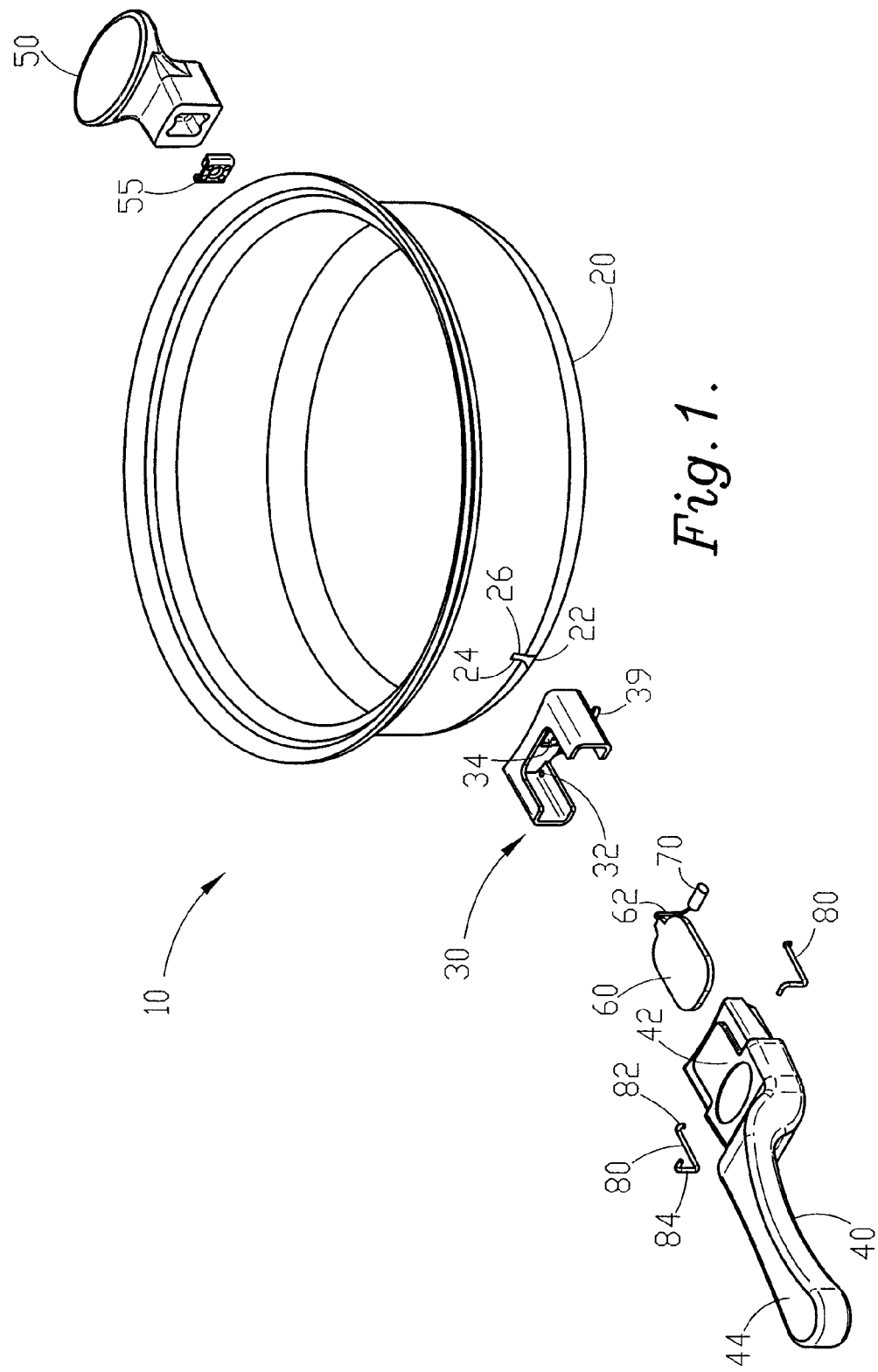

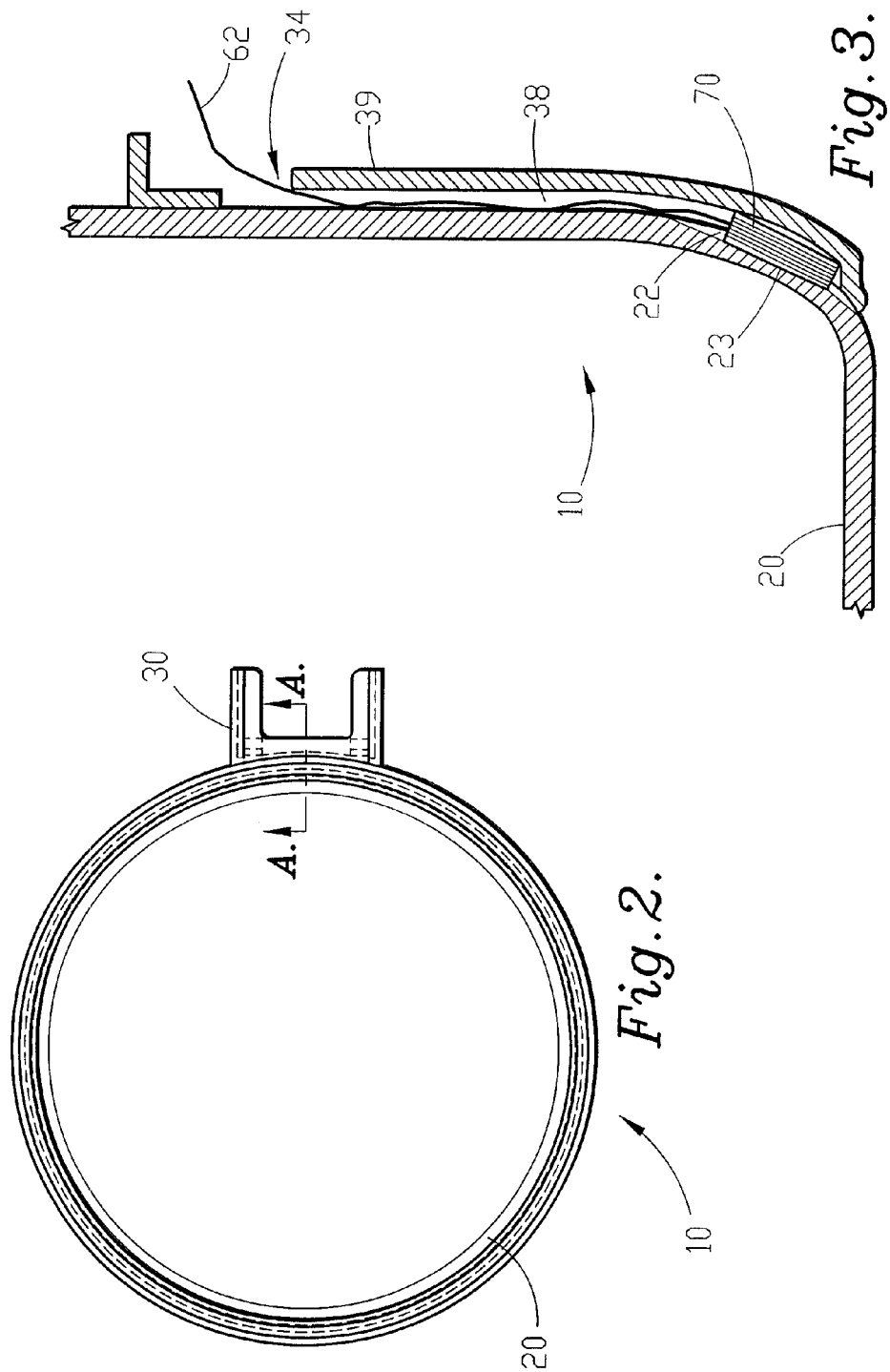

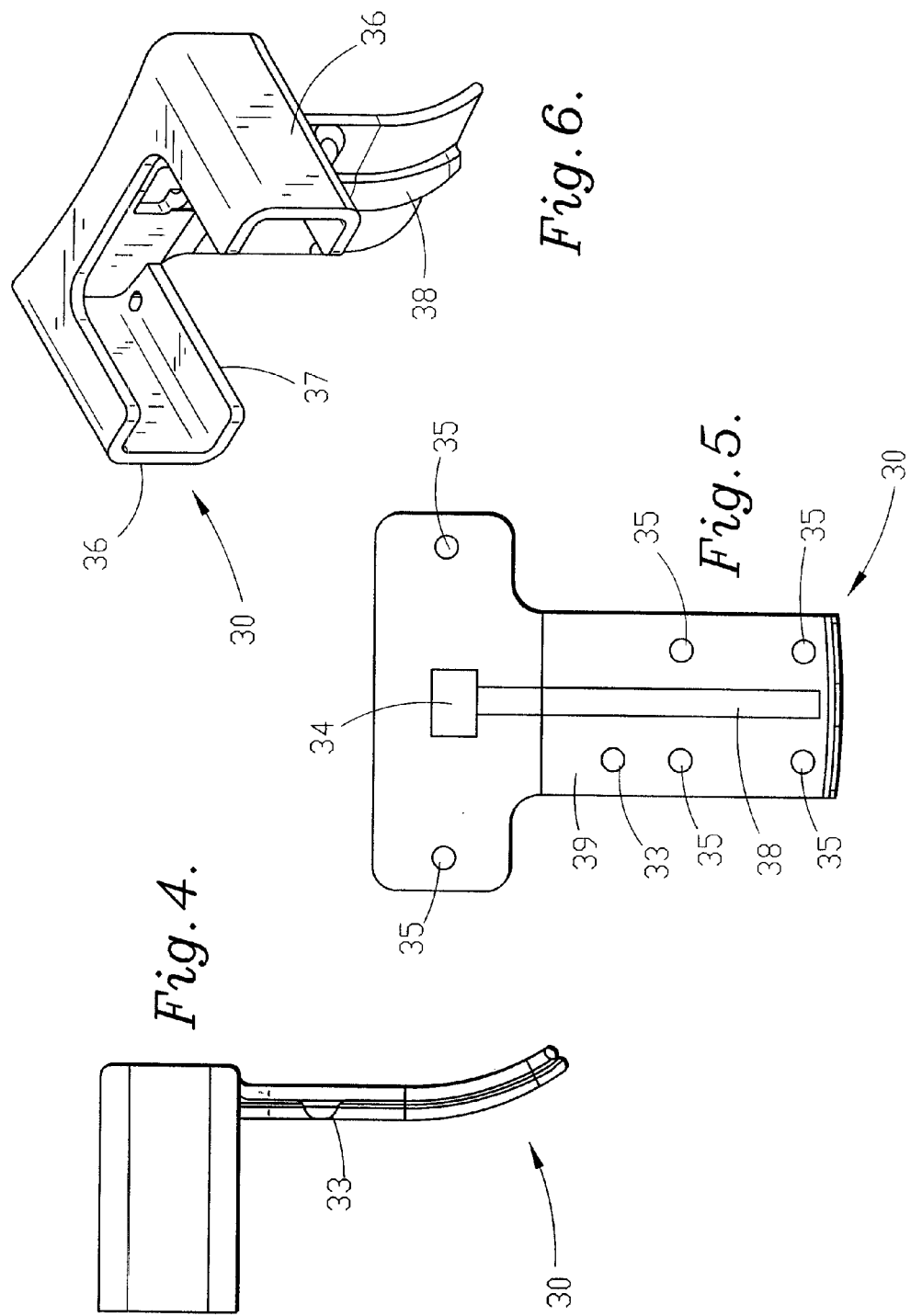

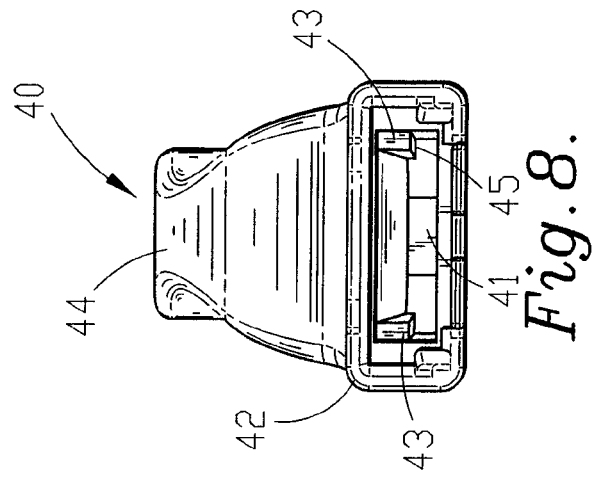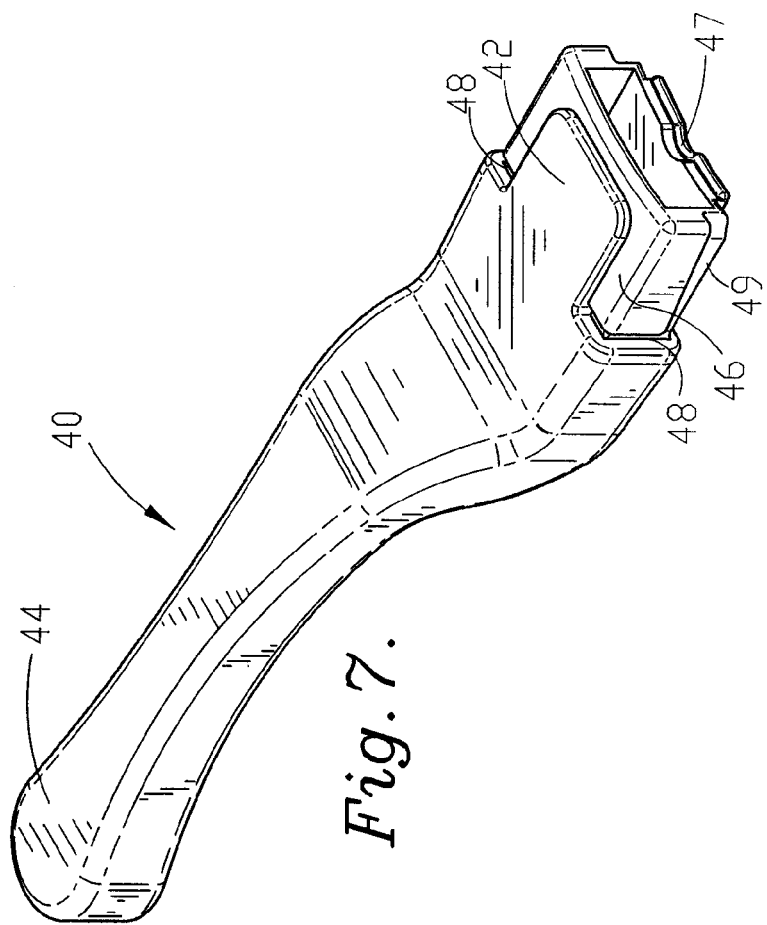

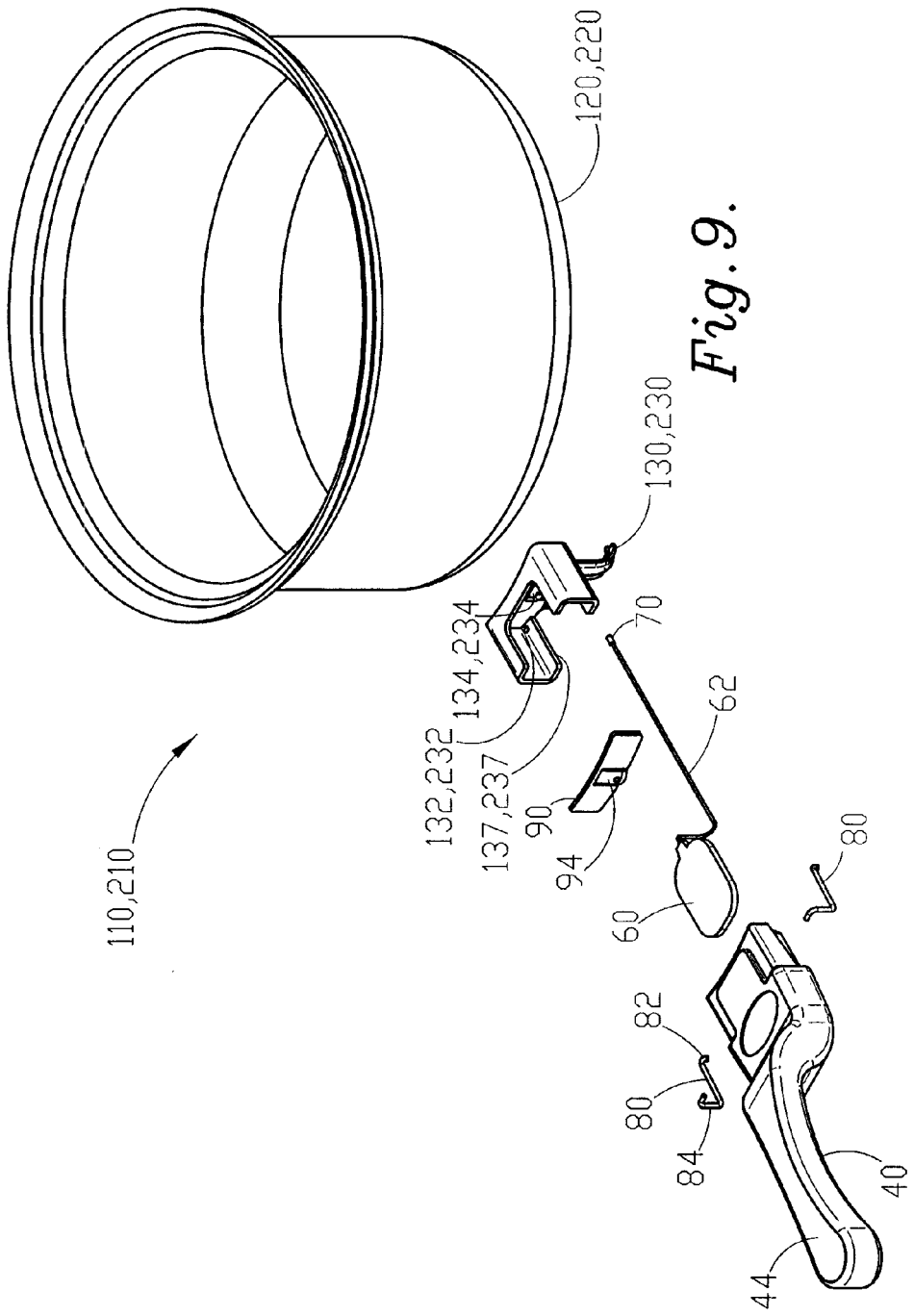

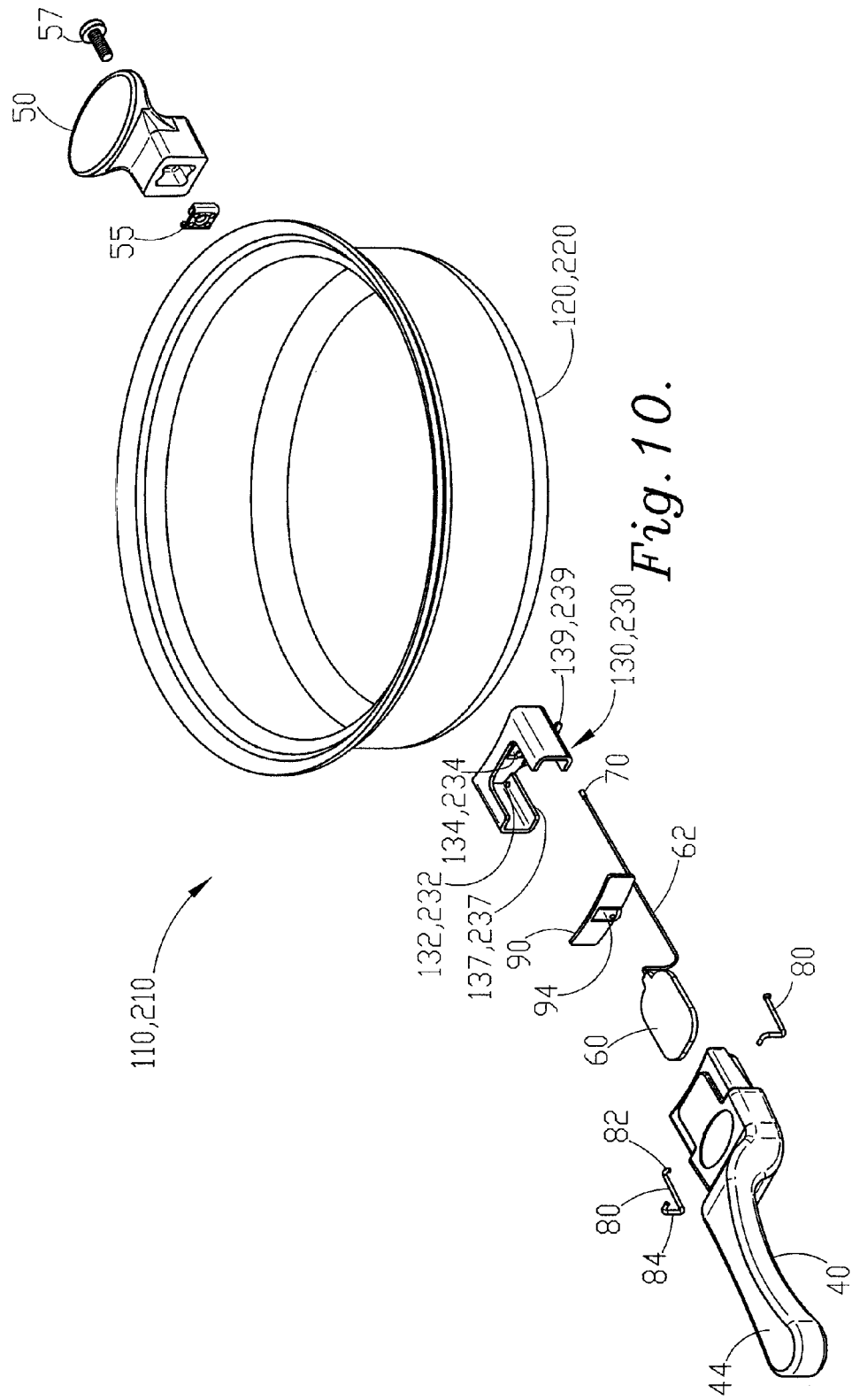

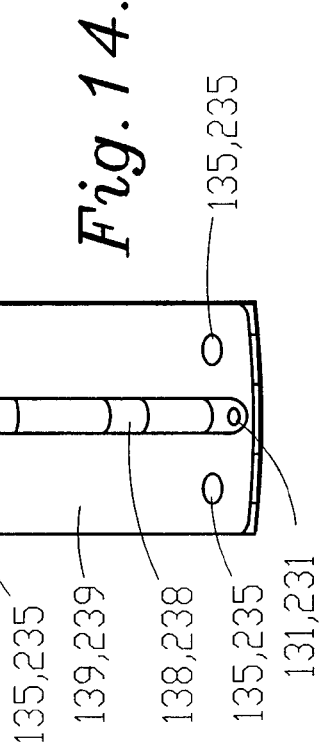
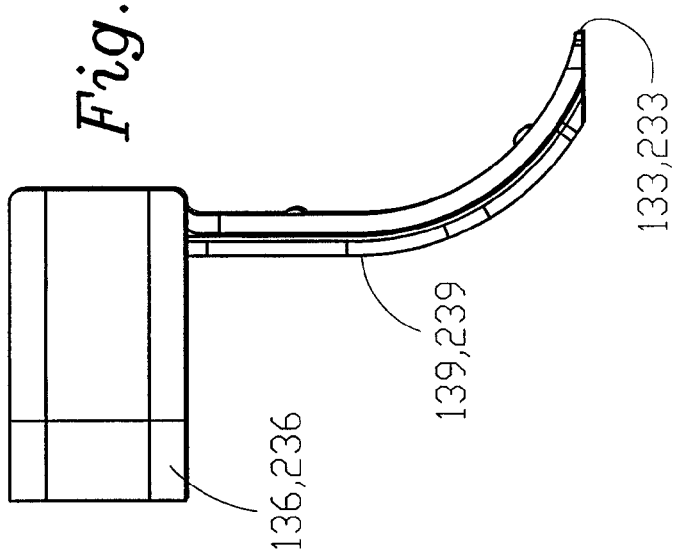

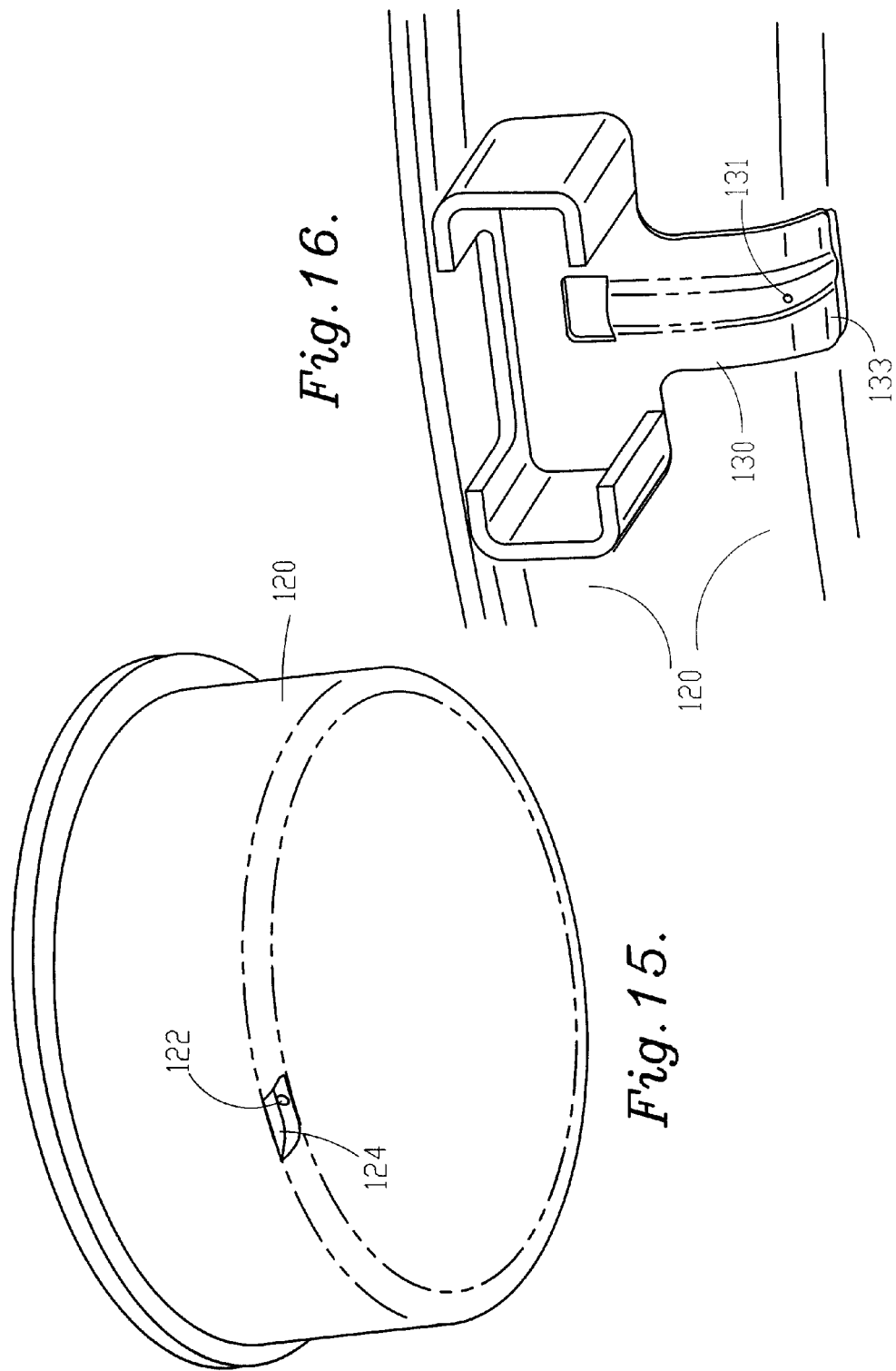

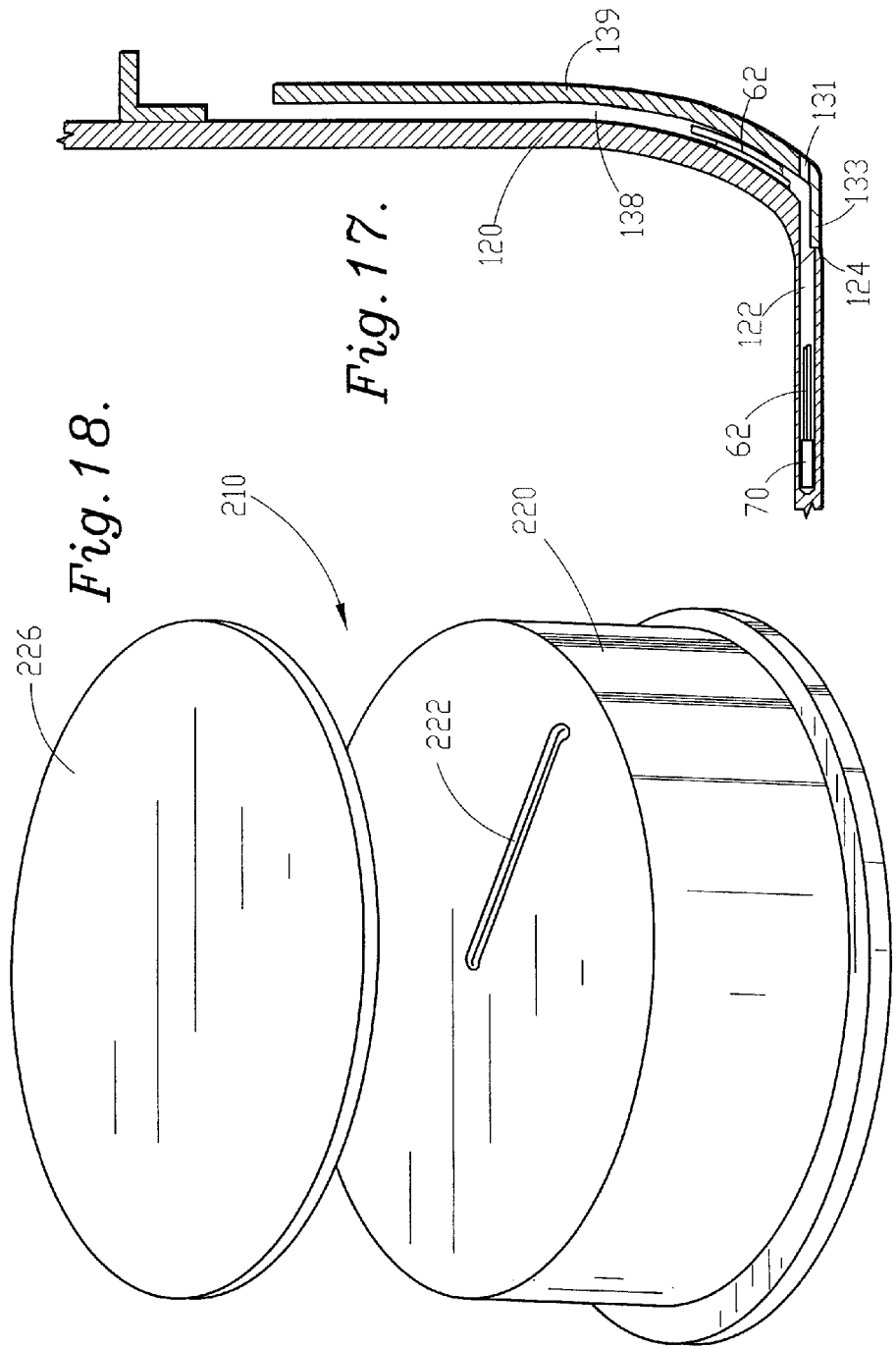

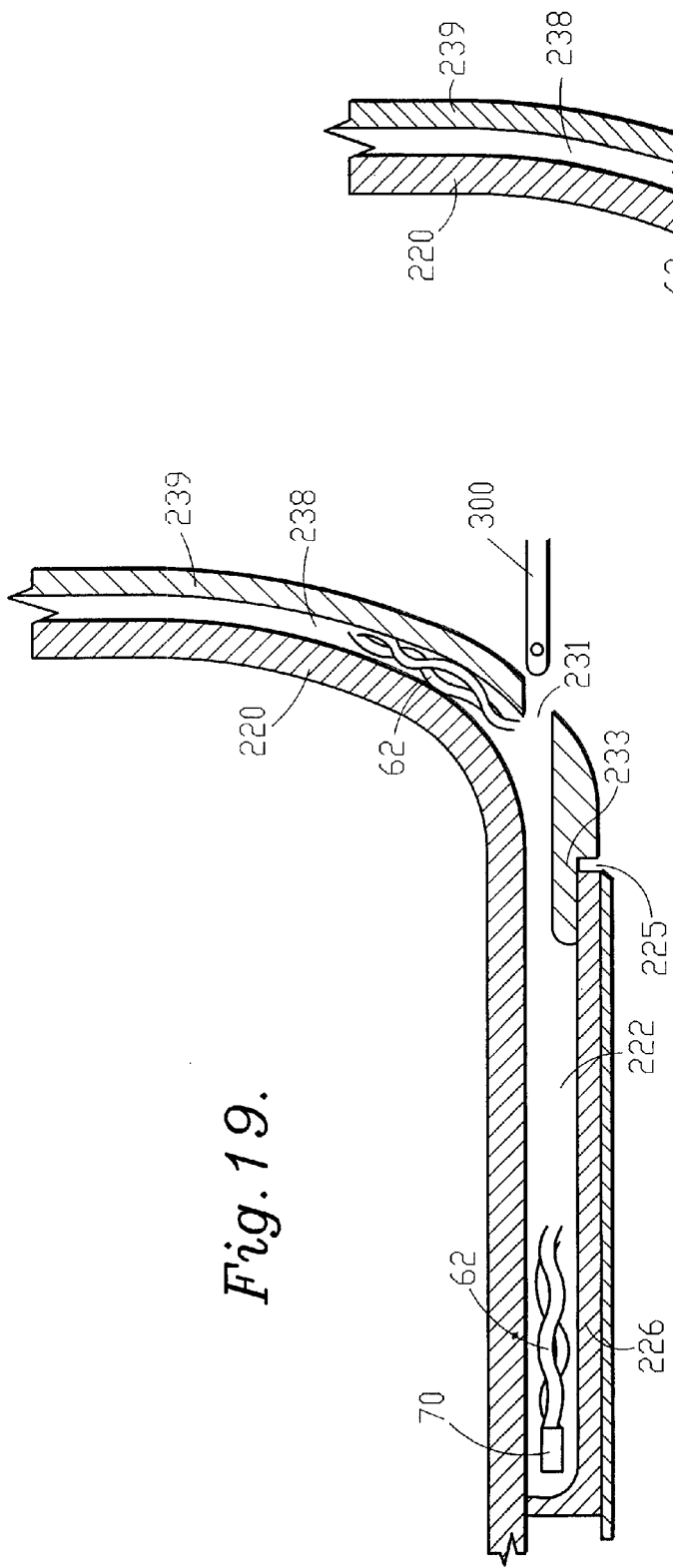

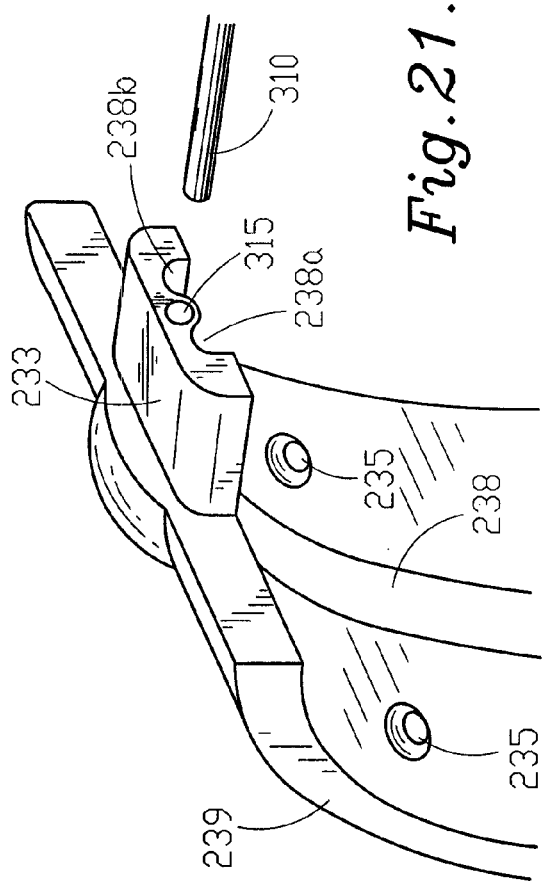
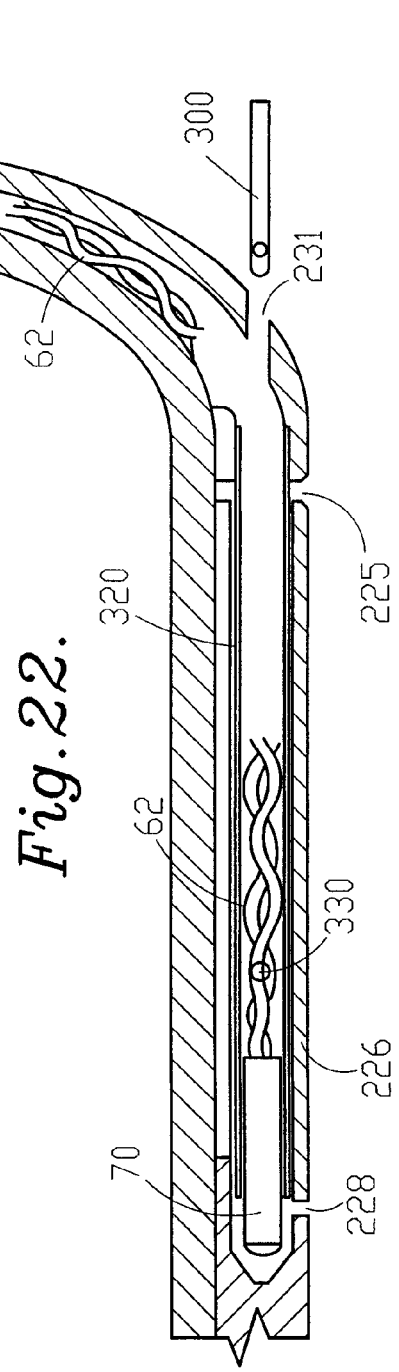
Fig.21.
Fig.22.

RADIO FREQUENCY IDENTIFICATION CONTROLLED HEATABLE OBJECTS

RELATED APPLICATIONS

This application is a continuation of U.S. application Ser. No. 10/833,356 filed Apr. 28, 2004 by Mamoru Imura, now U.S. Pat. No. 7,157,675, titled Radio Frequency Identification Controlled Heatable Objects, the entire disclosure of which is incorporated herein by reference.

FIELD OF THE INVENTION

The present invention is broadly concerned with temperature regulated cookware and servingware items, such as pots, pans, buffet serving pans, serving dishes, platters, and the like. More particularly, the invention is concerned with cookware and servingware objects that are temperature regulated using Radio Frequency Identification (RFID) technology and temperature sensors associated with the objects. An RFID tag, which is associated with a temperature sensor, includes information regarding heating characteristics of the particular object. The RFID tag transmits the information regarding the heating characteristics of the object as well as temperature reading information to a reader located within a cookware appliance, which are used by the cookware appliance to regulate the temperature of the cooking process.

BACKGROUND OF THE INVENTION

Cooking is often referred to as an art, not only because of the combination of ingredients that go into a particular recipe, but also due to the skill necessary for proper application and infusion of varying levels of heat over a given period of time throughout the different phases of the food preparation process. Traditional cookware appliances, such as ovens (microwave ovens being an exception), grills, heat lamps and stoves, all utilize the thermodynamic process of conduction to transfer heat from the outer surface of the food item to its interior. This is generally true regardless of the type of heat source used to heat the surface of the food, be it a radiation heat source (i.e. a heat lamp), conduction heat source (i.e. a stovetop), or a convection heat source (i.e. a convection oven or a food dehydrator).

The time and temperature necessary to cook fully and properly a specific food item through conduction is dependant upon the thermal conductivity of the item, the uncooked temperature of the item (i.e. frozen, room temperature, etc.), as well as the size and shape of the item. A food item having higher thermal conductivity will cook faster than a similarly sized and shaped food item having a lower thermal conductivity, as the heat will more quickly migrate from the outer surface to the interior. Likewise, a generally smaller or thinner food item will cook faster than a generally larger or thicker food item of the same thermal conductivity, as the heat must migrate a shorter distance through the thinner item. Frozen items require considerably more heat to cook than do non-frozen or thawed items. While increasing the cooking temperature for an item will increase the amount of heat that migrates from the surface to the interior of a food item, applying too much heat at one time will result in cooking the outer surface of the item faster than the heat can migrate to the interior, usually resulting in burning or scorching of the surface and undercooking of the interior. Therefore, obtaining real-time information regarding the temperature of the item being cooked, during the cooking process is often beneficial to ensure proper heating.

The use of thermometers or other temperature sensors to monitor and control the cooking process is well known. A common thermometer used to monitor and control the cooking process is a probe-type or contact thermometer which is inserted directly into the food item to obtain a temperature of the interior of the food item. Such thermometers are undesirable for many cooking applications. For, example, when cooking in pots or pans using a lid, the use of a probe-type thermometer requires removal of the lid each time a temperature reading is taken. Continuous removal of the lid during cooking reduces the transfer of heat to the item being cooked, and often results it a detrimental loss of moisture. In addition, the use of contact thermometers usually require manual adjustment of the power of the cooking appliance to obtain and maintain a desired temperature. Not to mention the probe-type thermometer is yet another cooking instrument that must be located and properly used during the often complex cooking process. To overcome the disadvantages associated with contact thermometers, a number of cookware-associated non-contact thermometers have been developed that are attached to, or incorporated into, cookware objects such as pots and pans. Such non-contact thermometers are often in communication with the cooking appliance to control the power level based on the temperature reading. Nevertheless, as discussed below, none of these non-contact thermometers, which control the cooking process solely based upon the temperature of the cookware object, provide a means of obtaining consistent and accurate measurement and control of the temperature of the food item being cooked within the cookware object.

U.S. Pat. No. 3,742,178 to Harnden, Jr. describes a non-contact thermometer placed in thermal contact with an inner wall surface of an inner cup of a cookware object, located between the inner cup and an outer cup in which the inner cup is nested. The inner cup is constructed of a ferromagnetic material that can be heated by an induction coil located in an induction cook-top appliance. Maintaining a stable connection between the temperature sensor and the inner wall of the inner cup is difficult due to thermal expansions and contractions during heating and cooling of the pot. In addition, a large temperature differential may often exist between the inner wall of the inner cup and the outer wall of the inner cup, particularly when extremely cold items are placed within the cookware object while the inner cup is being heated. This large temperature differential makes an accurate determination of the temperature of the food item within the pot difficult, if not impossible to obtain when the temperature reading is taken at the inner wall surface of the inner cup.

In the cookware object taught by Harnden, Jr., the field produced by the induction coil for heating the object also powers the temperature sensor which transmits temperature information to the cook-top appliance via radio frequency to control heating of the cookware object. Although such an arrangement works with induction heating appliances, the temperature sensor of Harnden, Jr. is inoperable when used with a traditional gas or electric stove which heats the cookware object by conduction. Furthermore, the nested cup design of Harnden, Jr., which includes a gap between the inner wall surfaces of the inner and outer cups filled with either thermal insulation material, air or vacuum, is inefficient for conducting heat from the outer cup to the inner cup, making use of the cookware object of Harnden, Jr. with traditional appliances undesirable even if use of the temperature sensor is utilized.

U.S. Pat. No. 5,951,900 to Smrke describes a non-contact temperature sensor that attempts to overcome many of the disadvantages of Harnden, Jr. by inclusion of a temperature sensor mounted to the exterior surface of a lid of cookware object. The temperature sensor of Smrke transmits, either via radio frequency or via wire, temperature information to a cookware appliance to control heating of the cookware object. Although Smrke asserts that a determination of the temperature on the lid of a cookware object is ideal for controlling cooking because such temperature is dependant upon heater power, pot type, food quantity, etc., Smrke does not provide an accurate means of determining temperature of the food item within the cookware object. Furthermore, as discussed above, maintaining a stable connection between the temperature sensor and a surface of the cookware object to which the sensor is attached is difficult due to thermal expansions and contractions during heating and cooling of the object.

Both Harnden, Jr. and Smrke teach cookware objects that are temperature regulated solely by the temperature obtained by the temperature sensors. While temperature information from the object is important, it is often not sufficient to obtain a desired regulation temperature within a desired period of time. For example, it is well known that the power applied to an object placed upon an induction cook-top depends greatly upon the distance between the object's ferromagnetic material and the work coil of the cook-top. Should an object require a particular graduated power application to prevent overheating of some parts of the object while reaching the desired regulation temperature throughout the object, it is essential that the proper power be coupled to the object. Furthermore, most practical heating operations require that the prescribed regulation temperature be reached within a maximum prescribed time. This restraint makes it even more important that proper power be applied during each temperature gradation. A means to correct for inconsistent power coupling that is based upon comparisons between power measurements and stored power coupling data is essential to achieve consistent heating operations and accurate temperature regulation.

U.S. Pat. No. 6,320,169 to Clothier, the disclosure of which is incorporated herein by reference, teaches the use of a Radio Frequency Identification (RFID) tag attached to an induction heatable object to transmit information (typically about a heating characteristic of the object) to a control system of an induction heating device. RFID is an automatic identification technology similar in application to bar code technology, but which uses radio frequency instead of optical signals. RFID systems can be either read-only or read/write. For a read-only system such as Motorola's OMR-705+ reader and IT-254E tag, an RFID system consists of two major components, a reader and a special "tag". The reader performs several functions, one of which is to produce a low-level radio frequency magnetic field, typically either at 125 kHz or at 13.56 MHz. The RF magnetic field emanates from the reader by means of a transmitting antenna, typically in the form of a coil. A reader may be sold in two separate parts: an RFID coupler, including a radio processing unit and a digital processing unit, and a detachable antenna. An RFID tag also contains an antenna, also typically in the form of a coil, and an integrated circuit (IC). Read/write systems permit two-way communication between the tag and reader/writer, and both the tag and the reader/writer typically include electronic memory for the storing of received information.

Although Clothier discloses that RFID controlled objects can be either cookware or servingware objects, all of the objects disclosed by Clothier are in the form of servingware objects, such as plates and cups. Such objects, which are designed to keep food that has already been cooked at an adequate serving temperature, are subjected to significantly lower temperatures and usually heated for shorter time intervals than are pots, pans and other cookware items, i.e. approximately 250 degrees Fahrenheit for servingware versus approximately 900 degrees Fahrenheit for cookware. Therefore, servingware objects have fewer design constraints than do cookware objects. For example, each of the servingware objects disclosed by Clothier include RFID tags located in the base of the objects, thermally insulated from the heating element or heatable portion of the object. The RFID tag is thermally insulated from the heatable portion of the object due to the limited operating temperatures for most RFID tags. The RFID tag is located in the base of the servingware objects disclosed by Clothier so as to be positioned parallel to and within a range of several inches from the RFID reader/writer located in the induction heating device to enable communication between the tag and the reader/writer during heating of the object. Nevertheless, locating an RFID tag in the base of a cookware object such as a pot or pan, makes adequate thermal insulation difficult to obtain. In addition, even if sufficient thermal insulation is provided, such insulation prevents the cookware object from being heated by traditional cook-top appliances, such as gas or electric stoves conduction stoves as the RFID tag is located directly in the heat-generation zone (i.e. the area directly above the heat source—such as the gas or electric burner for traditional heating appliances, or the induction coil for induction heating appliances—in which the energy used to heat the object is directed) for the object.

The RFID servingware objects disclosed by Clothier are primarily temperature regulated using heating algorithms based upon the heating characteristics transmitted from the object to the induction heating device. Clothier further discloses the inclusion of temperature regulation switches in combination with the RFID tag to better regulate the temperature of the object during heating. The temperature switches disclosed by Clothier operate to prevent or alter the transmission of information from the RFID tag to the induction heating device controller when the thermal switch experiences a predetermined temperature condition. Thus the temperature switches disclosed by Clothier do not provide the ability to obtain a temperature reading other than providing confirmation that the predetermined temperature has been exceeded. This results in a finite number of temperatures, based upon the number of temperature switches, to which the object can be accurately regulated. While such a finite number of predetermined temperatures is acceptable for servingware objects that function to keep already cooked food warm, cookware items, such as pots and pans require a much broader range of regulation temperatures. In fact, cooking of a single item can often require heating in several phases at varying temperatures.

The RFID controlled servingware object combined with temperature switches disclosed by Clothier is in the form of a sizzle plate typically used in restaurants. The temperature switches, which are connected to the RFID tag are placed in contact with the undersurface of the cast iron plate. While such an arrangement may be adequate for lower temperature servingware such as the sizzle plate, the problems associated with maintaining a stable connection to a surface of the heatable object discussed above still exist.

SUMMARY OF THE INVENTION

An object of the instant invention is to provide a temperature regulated object (or item). Another object of the instant invention is to provide a temperature regulated item that can be used for as servingware, cookware, and the like. Yet another object of the instant invention is to provide a temperature regulated item in which a temperature reading taken of the item is utilized in regulating the item's temperature. Another object of the instant invention is to provide a temperature regulated object in which the temperature reading provides an accurate indication of the temperature of the food being heated within the item without contacting the food. Still another object of the instant invention is to provide a temperature regulated item in which the temperature reading provides an accurate indication of the temperature of the food being heated within the item, and which can be used with traditional or induction heating devices. Another object of the invention is to provide a temperature regulated item having a temperature sensor contacting a heatable portion of the item. Yet another object of the present invention is to provide a temperature regulated item having a temperature sensor contacting a heatable portion of the item that is capable of regulating the item to an wide range of temperatures. Still another object of the instant invention is to provide a temperature regulated item having a temperature sensor contacting a heatable portion of the item, wherein the item is suitable for high temperature applications such as cooking. Another object of the present invention is to provide a temperature regulated item including a temperature sensor contacting a heatable portion of the item, wherein the connection between the sensor and the heatable portion of the item is capable of withstanding thermal expansion and contraction during heating and cooling of the item. An other object of the instant invention is to provide a temperature regulated item that having a temperature sensor contacting a heatable portion of the item, wherein the connection between the sensor and the heatable portion of the item is capable of withstanding thermal expansion and contraction during heating and cooling of the item, and which is capable of utilizing heating characteristics other than a temperature reading to regulate cooking temperature for the item.

The above described objects are achieved using a temperature regulated object including a heatable body, a temperature sensor and an RFID tag. The temperature sensor contacts the heatable body of the object, and is connected to the RFID tag by a pair of wires. The RFID tag acts as a transmitter (and sometimes as receiver) to communicate with a reader/writer located in a cook-top for heating the object, providing temperature information and other information regarding the object (such as heating characteristics) to the cook-top. The temperature information and the heating information is used by the cook-top to control the temperature of the object.

An illustrative embodiment of the instant invention is described in which the heatable object is a cookware object such as a pan. In a first embodiment of the invention, the temperature sensor is partially imbedded within a notch located in the side and toward the bottom of the pan, placed in contact with a conductive core of the pan. Partially imbedding the sensor in the body of the pan provides an improved connection between the sensor and the heatable body of the pan that is more capable of withstanding thermal expansion and contraction caused by heating and cooling of the pan. In addition, the partially imbedded temperature sensor is located closer to the interior of the pan and the food item being cooked, providing a more accurate reading of the temperature of the food item than is possible by measuring the temperature of the bottom surface of the pan, which will be influenced by the heat source. Furthermore, by partially imbedding the sensor, it is possible to utilize pan walls that are thinner than the diameter of the sensor.

In a second embodiment of the instant invention, the temperature sensor is imbedded within a tunnel that is formed in the bottom wall of the pan. In a preferred embodiment the pan in manufactured in a manner known in the art, and the tunnel is then drilled into the base of the pan. As with the side-notch embodiment, the bottom tunnel provides increased durability of the connection between the temperature sensor and the heatable portion of the pan, and places the temperature sensor closer to the interior of the pan. In addition, the bottom tunnel permits the temperature sensor to be located at the center of the pan where one of the hottest temperatures for the pan is obtained and is very robust against a dislocation of the pan from the center of the heating object, like a center of induction coil or center of halogen heater or center of electric heater and so on.

In a third embodiment of the instant invention, the temperature sensor is imbedded between the bottom of the pan and a slab connected to the pan bottom. One variation of this slab-bottom includes a slot formed in the slab for placement of the temperature sensor and associated wires. This allows for placement of a temperature sensor at the center of the pan base, even when the pan walls are relatively thin (thinner than the diameter of the sensor). Another variation of the slab bottom includes a slot formed in the bottom of the pan itself. In this embodiment, the temperature sensor is positioned closer to the interior of the pan.

The RFID tag is located within a cavity formed in the handle of the pan of the instant invention to position the tag outside of the heat-generation zone for the pan. This reduces the temperature to which the tag is subjected, maximizing the life of the tag. Ramped guide channels are located within the cavity to guide the RFID tag into a proper assembled location. The handle holds the RFID tag parallel to the cook-top surface for maximum signal strength during operation. The inventive handle includes a releasable spring-clip connection between the handle and a receiver for supporting the handle.

The receiver of the instant invention supports the handle. A window between a pair of opposing supports maximizes the strength of the signal transmitted between the RFID tag and the reader/writer by minimizing obstruction of the RFID tag antenna. In a preferred embodiment of the invention, the receiver includes an injection port for injecting a potting material into a tunnel or slot in which the temperature sensor in located. In alternative preferred embodiments, a rigid rod or tube is connected to the receiver and the temperature sensor to aid in insertion of the sensor in the tunnel or slot during assembly.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 1 is an exploded perspective view of a RFID controlled frying pan of the instant invention in which a temperature sensor is positioned in a notch in the side of the pan.

FIG. 2 is a partial top plan view of the RFID controlled frying pan shown in FIG. 1.

FIG. 3 is a partial section view taken along line A-A of FIG. 2 showing the notched side and corresponding temperature sensor in detail.

FIG. 4 is a side elevation view of a receiver for connecting a handle to the frying pan shown in FIG. 1.

FIG. 5 is a rear elevation view of the receiver of FIG. 4.

FIG. 6 is a frontal perspective view of the receiver of FIG. 4.

FIG. 7 is a perspective view of a handle for the frying pan shown in FIG. 1.

FIG. 8 is an end view of the handle shown in FIG. 7.

FIG. 9 is an exploded perspective view of a RFID controlled sauce pan of the instant invention in which a temperature sensor is positioned at the center of the base of the pan.

FIG. 10 is an exploded perspective view of a RFID controlled frying pan of the instant invention in which a temperature sensor is positioned at the center of the base of the pan.

FIG. 13 is a side elevation view of an embodiment of a receiver for connecting the RFID housing handle to any of the pans shown in FIG. 9 through 11.

FIG. 14 is a rear elevation view of the receiver of FIG. 13.

FIG. 15 is a detailed perspective view of the pan of FIG. 12 showing a notch for accepting a end tab of a receiver.

FIG. 16 is a detailed perspective view of the pan of FIG. 15 showing a receiver assembled with the notch.

FIG. 17 is a partial section view of the pan of FIG. 12 fully assembled showing the tunnel, receiver and corresponding temperature sensor in detail.

FIG. 18 is an exploded perspective view of a first embodiment of a slab bottom pan having a slot in the base of the pan.

FIG. 19 is a partial section view of second embodiment of a slab bottom pan having a slot in the slab, showing a first embodiment for a receiver.

FIG. 20 is a partial section view of second embodiment of a slab bottom pan having a slot in the slab, showing an alternative embodiment for a receiver.

FIG. 21 is a partial perspective view of the receiver presented in FIG. 20.

FIG. 22 is a partial section view of second embodiment of a slab bottom pan having a slot in the slab, showing another alternative embodiment for a receiver.

DESCRIPTION OF PREFERRED EMBODIMENTS

Figure 11:
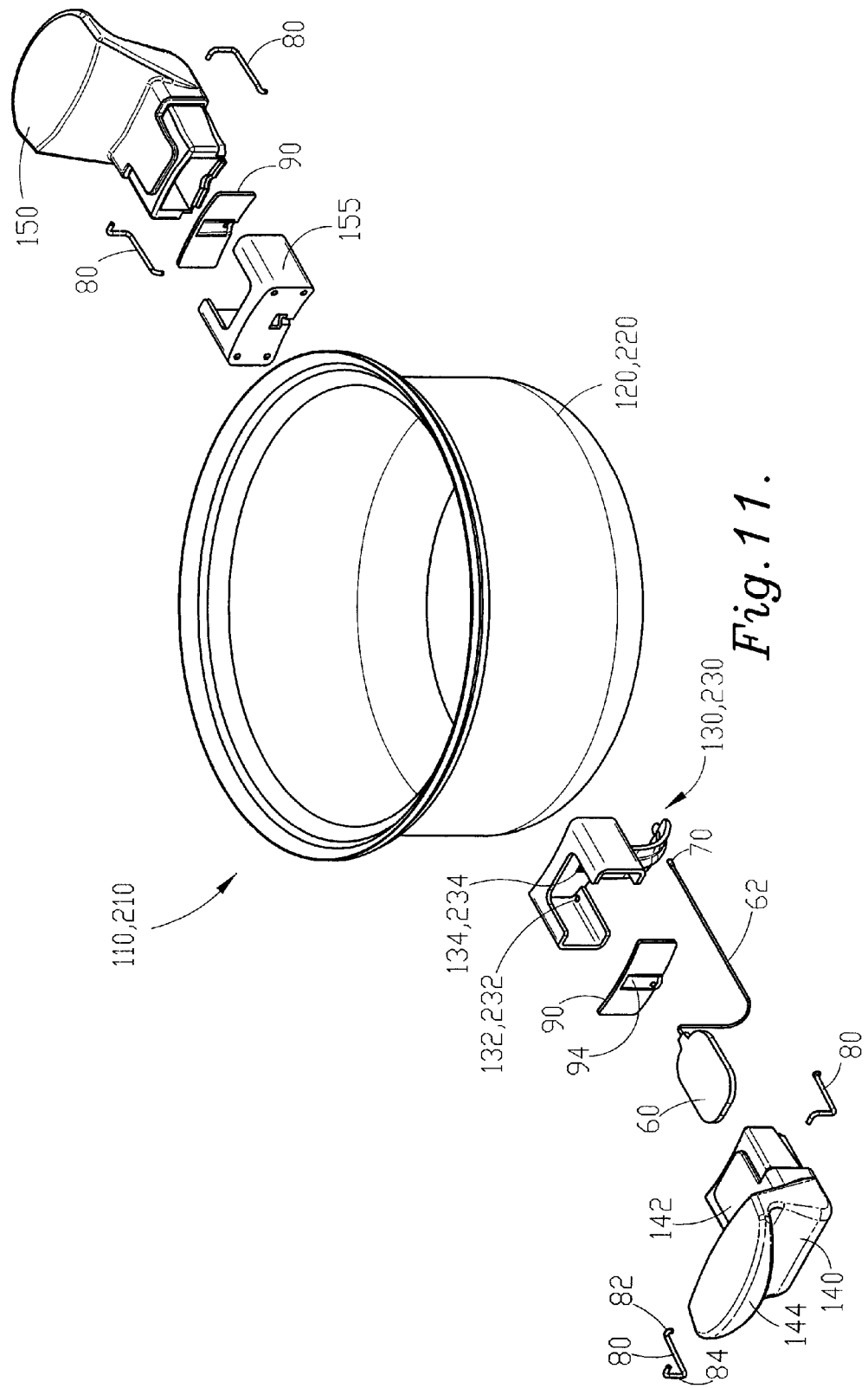
FIG. 11 is an exploded perspective view of a RFID controlled pot of the instant invention in which a temperature sensor is positioned at the center of the base of the pot.

As required, detailed embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The instant invention is concerned with temperature regulated objects in which a temperature reading from the object is transmitted to a controller for a heat source. The controller for the heat source utilizes the temperature reading to control the amount of heat applied from the heat source on the object to control a cooking process. In a preferred embodiment of the instant invention, other information about the object, such as identification information or heating characteristics for the object, are transmitted to the controller of the heat source. This other information, along with the temperature reading, is utilized by the controller of the heat source in regulating the temperature of the object during the cooking process.

Preferred embodiments of the instant invention are described herein in the form of temperature regulated cookware objects, such as pots and pans; it will however be appreciated that the instant invention relates to all temperature regulated objects including cookware objects as well as servingware objects. In addition, the instant invention relates to component parts of temperature regulated objects. In a preferred embodiment, the temperature regulated objects of the instant invention are intended to be used in connection with a Radio Frequency Identification (RFID) controlled induction heating appliance, similar to that discussed in U.S. Pat. No. 6,320,169, the disclosure of which is incorporated herein by reference. Nevertheless, it will be appreciated that temperature regulated objects intended to be heated by RFID controlled traditional cookware appliances (i.e. gas and electric stoves) are included within the scope of the instant invention. Furthermore, the scope of the instant invention includes temperature regulated objects utilizing non-RFID alternative means of transmitting object heating characteristic information and temperature reading information to a cookware appliance which are now known or later discovered.

Referring to FIGS. 1 through 3, a first embodiment of an RFID controlled cookware object, in the form of a frying pan is shown. FIG. 1 shows an exploded view of cookware object 10 including pan body 20, primary handle 40, and secondary (helper) handle 50. Primary handle 40 is connected to pan body 20 via bracket/receiver 30. Spring clips 80 releasably secure primary handle 40 to receiver 30 through the engagement of clip ends 82 with holes 32 in receiver 30. Helper handle 50 is connected to pan body 20 via bracket 55. An RFID tag, 60, is connected to temperature sensor 70 via a pair of wires, 72. RFID tag 60 is stored in a cavity located within handle 40. Wires 72 extend from the interior of the cavity through a portal 34 of receiver 30 to sensor 70 which is generally located between receiver 30 and the exterior of pan body 20 within notch 22 formed into the side of pan body 20.

Pan body 20 is fabricated from materials and manufactured by means well known in the art. Types of materials commonly used for fabrication of pan body 20 include, but are not limited to, cast iron, stainless steel, aluminum, aluminum alloys, copper, copper-clad stainless steel, etc. In a preferred embodiment, pan body 20 is fabricated to be used for induction cooking. Although a number of materials can be utilized for fabrication of a pan body capable of induction heating, the construction of a multi-ply body comprising layers of several different materials is quite common. The specific material used for each ply or layer, the thickness of each layer, and the total number of layers will vary depending upon the size, shape, desired appearance and desired heating characteristics of the pan. In an exemplary embodiment, pan body 20 is a 5-ply construction, including a first layer of magnetic stainless steel forming the interior cooking surface of the pan, a second inner-layer of 3003 pure aluminum, a third inner-layer of 1145 aluminum alloy, a fourth inner-layer of 1145 aluminum, and a fifth layer of magnetic stainless steel forming the exterior surface of the pan. The two surface layers of magnetic stainless steel provide strength, durability, easy cleaning and a long-lasting, attractive appearance to the pan body. The exterior surface layer of magnetic stainless steel builds up heat generated from a stove cook-top (either by conduction in a traditional stove, or by induction utilizing the ferromagnetic properties of the steel in an induction stove)generally at the center of the base of the pan body. The three layers of aluminum and aluminum alloy, which form an aluminum core for the pan, absorb heat quickly from the exterior layer of steel, and smoothly and evenly distribute the heat through conduction across the bottom and sides of the pan body to the inner layer of steel.

FIGS. 4 through 6 show detail views of receiver 30 for use with the RFID controlled cookware object shown in FIGS. 1 through 3. Receiver 30 includes support members 36 for engaging handle 40. Spring clips 80 frictionally engage with support member 36 to releasably secure handle 40 to receiver 30. Support members 36 of receiver 30 perform several functions, one is to support handle 40 in the manner described above, an other is to increase and/or concentrate the transmission signal strength between tag 60 and a reader/writer located below the surface of a cook-top. The transmission signal is increased and/or concentrated through the use of window 37 that is formed between the lower interior edges of opposing support members 36. Window 37 provides a generally unobstructed transmission zone between tag 60 and the reader/writer of the cook-top. The size and shape of window 37 is adjusted based upon the particular arrangement of the antenna of pan tag 60 to help tune the transmission signal by reducing obstruction between the antenna of pan tag 60 and the antenna of the reader/writer located in the cook-top.

FIGS. 2 and 3 show detail views of receiver 30 in attached engagement with pan body 20, wherein handle 40 has been removed. Receiver 30 includes member 39 extending downward from support members 36 to the base of pan body 20. Channel 38 is formed in member 39 to permit wires 62 and sensor 70 to be located in the cavity created between member 39 of receiver 30 and pan body 20. Member 39 covers notch 22 and sensor 70 which is located in notch 22. Notch 22 is machined (EDM, CNC, etc.) into the side of pan body 20 exposing the aluminum core and permitting contact of the aluminum core by sensor 70. The lower-most portion of member 39 extends beyond the bottom of sensor 70 and inward to surround sensor 70 and provide a clean, generally flush base for the assembled combination of pan body 20 and receiver 30.

Receiver 30 is manufactured of a metal such as steel, aluminum alloy, or any other material suitable for supporting handle 40 to pan body 20. In the preferred embodiment described herein, in which pan body 20 is heated by induction, receiver 30 is manufactured from a non-ferromagnetic material, such as non-magnetic stainless steel, to reduce the possibility that receiver 30 will be heated by the magnetic field of the cook-top. Receiver 30 includes recess 33 which corresponds to a locator (not shown) protruding from pan body 20. The combination of the locator and recess 33 ensures proper alignment of receiver 30 over notch 22 during assembly and throughout the life of cookware object 10. In a preferred embodiment, receiver 30 is welded or braised to pan body 20 for a long-lasting, durable connection, and channel 38 is filled with a potting material, such as a high temperature silicone like Loctite® 5406, to protect the exposed aluminum core of pan body 20 and to secure sensor 70 within notch 22.

To aid in an automated braising process, receiver 30 includes a number of nubs (welding/braising lugs) 35 protruding from the back surface of the receiver, which contact the outer surface of pan body 20 when receiver is properly positioned over notch 22. Nubs 35 are formed of a material having a lower melting point than the material used to manufacture receiver 30, allowing nubs 35 to be melted for braising by applying heat to the surface of receiver 30 opposite nubs 35, without melting receiver 30.

Tag 60 is located within end 42 of handle 40. To position tag 60 within operating range from the reader/writer located within the cook-top, receiver 30 locates handle end 42 relatively close to the base of pan body 20. On most cookware items, such a placement of handle end 42 is much lower than normally utilized. In many instances, low placement of the handle on a cookware object can make the object difficult to handle and even unsafe, especially when the cookware object is used on traditional stoves-tops in which the burner surface gets extremely hot. To provide safer and easier handling of pan 10, handle 40 curves upward from end 42 to end 44. This allows the cook to grasp handle 40 at end 44 without being too close to the surface of the cook-top.

FIGS. 7 and 8 show handle 40 apart from pan 10. End 42 of handle 40 includes section 46 that is cut away in relief to permit handle end 42 to engage with receiver 30. In addition, the relief cutaway results in a flush outer-surface connection between handle end 42 and receiver 30, giving pan 10 a clean professional appearance. Cutaway section 46 further includes an additional relief-cut graduated ramp and groove on each side of handle 40 for receipt of spring clips 80. Grooves 48 are cut partially into the top of handle 40 and extend down each side to the bottom of handle 40. Ramps 49 are cut into each side of handle 40, originating from grooves 48 and sloping upward to the end of handle 40. Spring clips 80 are positioned into grooves 48 and ramps 49 on each side of handle 40 such that end 84 of each spring clip fits within groove 48, the main body of each spring clip extends generally along ramp 49, and opposing end 82 of each spring clip curves downward from handle 40 at the pan-side end of handle 40. As is discussed above, spring clips 80 releasably secure primary handle 40 to receiver 30 through the engagement of clip ends 82 with holes 32 in receiver 30. Ramps 49 provide room for lateral movement of ends 82 of spring clips 80 during assembly and disassembly of handle 40 to receiver 30. Handle 40 can be removed from receiver 30 by depressing ends 82 of spring clips 80 through holes 32 of receiver 30 and simultaneously pulling handle 40 away from receiver 30.

End 42 of handle 40 includes internal cavity 41 for housing RFID tag 60. Each side of cavity 41 includes a graduated guide ramp, 43, which slopes downward from the pan-side end of handle 40 toward the interior of cavity 41. Ramp 43 leads to channel 45 which extends into cavity 41. During assembly, RFID tag 60 is inserted into cavity 41 of handle 40, ramps 43, located on each side of cavity 41, guide tag 60 into channels 45. When fully assembled, channels 45 hold RFID tag 60 generally parallel to the cook-top surface, providing optimum signal transmission between the antenna of RFID tag 60 and the antenna of the reader/writer. As any condensation or moisture within cavity 41 can harm tag 60, handle 40 includes notch 47 located at the pan-side end to permit drainage of any moisture that accumulates within cavity 41.

Although handle 40 can be constructed from any suitable material, handle 40 is preferably molded of a phenolic resin commonly used for pot and pan handles of the prior art. Use of a phenolic resin to mold handle 40 provides for quick and easy production of a unitary handle including cutaway relief 46, grooves 48, ramps 49, cavity 41, notch 47 and all other components of handle 40. Use of alternate materials that are not suitable for molding or casting would require machining of handle 40 to provide such components as cutaway relief 46, grooves 48, ramps 49, cavity 41, and notch 47. In addition, a phenolic material provides minimal interference to the transmission between RFID tag 60 and the reader/writer in the stove-top.

As is shown in FIG. 3, sensor 70 is partially imbedded within the wall of pan body 20. Notch 22 extends slightly more than half way into the thickness of the wall of pan body 20, permitting sufficient contact between sensor 70 and the aluminum core of pan body 20, while also maintaining the integrity of the pan structure, particularly the integrity of the interior cooking surface of pan body 20. Partially imbedding sensor 70 within pan body 20 basically provides three points of contact between sensor 70 and pan body 20, one at inner face 23 of notch 22, and one on each of sides 24 and 26 of notch 22. Such an arrangement maintains a more stable connection between sensor 70 and pan body 20 that is less impacted by thermal expansions and contractions during heating and cooling of the object, than is possible with surface connections used in prior art devices. In addition, partially imbedding temperature sensor 70 into pan body 20 locates sensor 70 closer to the food being cooked within object 10, providing a more accurate temperature for cooking purposes than the prior art surface-mounted sensors.

In a preferred embodiment, temperature sensor 70 is a resistance temperature detector (RTD), which changes electrical resistance with the change of temperature. The electrical resistance of RTD sensor 70 is measured by RFID tag 60 which is connected to sensor 70 by wires 62. RFID tag 60 then transmits temperature information to the reader/writer located within the stove so that the power level provided by the stove can be adjusted accordingly by a controller within the stove to maintain the desired cooking temperature. The temperature information transmitted from tag 60 to the stove can be the resistance measurement, or alternatively, the actual temperature reading based upon the resistance measurement. In a preferred embodiment, tag 60 includes a microprocessor connected to sensor 70 via wires 62. The microprocessor stores specification information regarding sensor 70, such as a resistance measurement to temperature table, and using the resistance measurement obtained from sensor 70 along with the specification information, calculates the temperature. Tag 60 then transmits the temperature to the reader/writer in the stove-top to be used by control algorithms of the stove-top controller. In an alternative embodiment, tag 60 transmits the resistance measurement directly to the stove-top controller and the controller will calculate the temperature. In this embodiment, it will be necessary for the stove-top controller to obtain specification information regarding sensor 70 to calculate the temperature. Such information can be stored in tag 60 and transmitted to the controller along with the resistance measurement.

The side-notch location of temperature sensor 70 described in connection with FIGS. 1 through 6, provides considerable versatility for materials in construction of cookware object 10. In particular, the total thickness of the walls of pan body 20 can vary in thickness regardless of the diameter of sensor 70. As is seen in FIG. 3, sensor 70 can have a diameter greater than the total thickness of the wall of pan body 20, and partly protrude from the exterior surface of pan body 20. Such an arrangement is beneficial it situations in which it is desirable to have relatively thin walls for the pan body. Nevertheless, the location of the temperature sensor at the side of pan body 20 does not provide the optimum temperature reading for temperature regulation of the cookware. The optimum temperature reading is generally found at the center of the base of the pan body, as this is where the food items are usually positioned, and also where the highest temperature reading will be found. When sensor 70 is positioned at the side-notch location, the temperature at the center of the base of pan body 20 can be estimated using the conductivity constants for the materials of pan body 20. If it is desirable to obtain the exact (rather than estimated) temperature of the center of the base of the pan body, it is necessary to position the temperature at the center of the pan body. FIGS. 9 through 23, discussed below, show several embodiments of heatable cookware objects, and related components, in which the temperature sensor is located at the center of the base of the object. In a first embodiment, the sensor is positioned within a tunnel that extends into the center of the base of the object from the side of the object. In a preferred embodiment, the tunnel is drilled or machined in the object after the object has been manufactured. In a second embodiment, the sensor is within a tunnel that is formed between the bottom of the object and a slab that is connected to the bottom of the object.

FIGS. 9 through 11 show exploded views of three different types of pans, 110, 210, utilizing either a tunnel (110) or a slab bottom (210) to locate a temperature sensor at the center of the base of the pan. While both the tunnel, 110, and the slab bottom, 210, embodiments enable location of the temperature sensor at the center of the base of pan 110, 210, each embodiment provides several unique advantages. Tunnel pan 110 results in pan body 120 having a unitary construction, and generally positions the temperature sensor in relatively close proximity to the food item being cooked, as opposed to slab bottom pan 220. Nevertheless, the wall thicknesses of pan body 120 will usually be thicker than those of pan body 220 and also pan body 20 of the side notch embodiment, 10, (discussed above), so as to allow the temperature sensor to become fully imbedded in pan body 120. Other advantages of the various embodiments of the instant invention will become apparent through the following description.

FIG. 9 shows an exploded view of cookware object 110, 210 including pan body 120, 220 in the form of a two quart saucepan or pot. Saucepan 110, 210 also includes handle 40, which is of identical construction as handle 40 discussed above. Handle 40 is connected to pan body 120, 220 via bracket/receiver 130, 230. Spring clips 80 (identical to those discussed above) releasably secure handle 40 to receiver 130, 230 through the engagement of clip ends 82 with holes 132, 232 in receiver 130, 230. An RFID tag, 60 (identical to that discussed above), is connected to temperature sensor 70 (identical to that discussed above) via a pair of wires, 72 (identical to those discussed above, but longer to extend to the center of the pan base). RFID tag 60 is stored in a cavity located within handle 40. Gasket 90, made of high temperature silicone, is located between receiver 130, 230 and handle 40 to thermally shield tag 60 from radiating heat of the pan sidewall, aiding in maintaining the temperature within the cavity of handle 40 below the desired maximum operating temperature of tag 60 (generally 100° C.). Wires 72 extend from the interior of the cavity through portal 94 of silicone gasket 90, through portal 134, 234 of receiver 130, 230, between receiver 130, 230 and the exterior of pan body 120, 220, and to sensor 70 which is generally located between at the center of the base of pan body 120, 220.

FIG. 10 shows an exploded view of cookware object 110, 210 including pan body 120, 220 in the form of a frying pan similar to pan 10 discussed above. Pan 110, 210 includes primary handle 40, and secondary (helper) handle 50, both of which are of identical construction as primary handle 40 and helper handle 50 discussed above. Primary handle 40 is connected to pan body 120, 220 via bracket/receiver 130, 230. Lateral member 139, 239 of receiver 130, 230 shown in FIG. 10 is shorter in length to accommodate the shallower frying pan of FIG. 10 than is the same member for the deeper pans shown in FIGS. 9 and 11. Spring clips 80 (identical to those discussed above) releasably secure primary handle 40 to receiver 130, 230 through the engagement of clip ends 82 with holes 132, 232 in receiver 130, 230. Helper handle 50 is connected to pan body 120, 220 via bracket 55 and screw 57. An RFID tag, 60 (identical to that discussed above), is connected to temperature sensor 70 (identical to that discussed above) via a pair of wires, 72 (identical to those discussed above, but longer to extend to the center of the pan base). RFID tag 60 is stored in a cavity located within handle 40. Gasket 90, made of high temperature silicone, is located between receiver 130, 230 and handle 40 to thermally shield tag 60, aiding in maintaining the temperature within the cavity of handle 40 below the desired maximum operating temperature of tag 60 (generally 100° C.). Wires 72 extend from the interior of the cavity through portal 94 of silicone gasket 90, through portal 134, 234 of receiver 130, 230, between receiver 130, 230 and the exterior of pan body 120, 220, and to sensor 70 which is generally located between at the center of the base of pan body 120, 220.

FIG. 11 shows an exploded view of cookware object 110, 210 including pan body 120, 220 in the form of a four quart sauce pan/pot. Pot 110, 210 includes primary handle 140, and secondary (helper) handle 150. Primary handle 140 is connected to pan body 120, 220 via bracket/receiver 130, 230. Spring clips 80 (identical to those discussed above) releasably secure primary handle 140 to receiver 130, 230 through the engagement of clip ends 82 with holes 132, 232 in receiver 130, 230. Helper handle 150 is connected to pan body 120, 220 via bracket 155 and spring clips 80. An RFID tag, 60 (identical to that discussed above), is connected to temperature sensor 70 (identical to that discussed above) via a pair of wires, 72 (identical to those discussed above, but longer to extend to the center of the pan base). RFID tag 60 is stored in a cavity located within handle 140. Gasket 90, made of high temperature silicone, is located between receiver 130, 230 and handle 140 to thermally shield tag 60, aiding in maintaining the temperature within the cavity of handle 140 below the desired maximum operating temperature of tag 60 (generally 100° C). Another gasket, 90, can also be located between bracket 155 and secondary handle 150 to maintain a cooler operating temperature for handle 150. Wires 72 extend from the interior of the cavity in handle 140 through portal 94 of silicone gasket 90, through portal 134, 234 of receiver 130, 230, between receiver 130, 230 and the exterior of pan body 120, 220, and to sensor 70 which is generally located between at the center of the base of pan body 120, 220.

Primary handle 140 shown in FIG. 11 is constructed in a similar manner to handle 40 discussed above, the primary difference being the arrangement of the grasping ends 44 and 144 of handles 40 and 144, respectively. Handle grasping end 144 extends generally upward from pot-side end 142 of handle 140 and then extends outward away from pot body 120, 220. Grasping end 144 of handle 140 is generally shorter and taller than grasping end 44 of handle 40 to accommodate the deeper pot on which handle 144 is utilized. Generally, shorter handles positioned toward the top of deeper pot bodies are customary in the art to provide better aesthetics and handling of the deeper bodies. Pot-side end 142 of handle 140 is constructed in a manner identical to pan-side end 42 of handle 40, including (but not limited to) the relief-cutaway section, the spring retaining grooves and ramps, internal cavity and the drain notch. Although helper handle 150 does not require an internal cavity for housing an RFID tag, for ease of manufacturing, helper handle 150 is identical to handle 140. In addition, bracket 155 can be identical to receiver 130, 230. In the preferred embodiment shown in FIG. 11, bracket 155 is identical to receiver 130, 230, except that the unnecessary lateral member, 139, 239, is removed.

Figure 12:
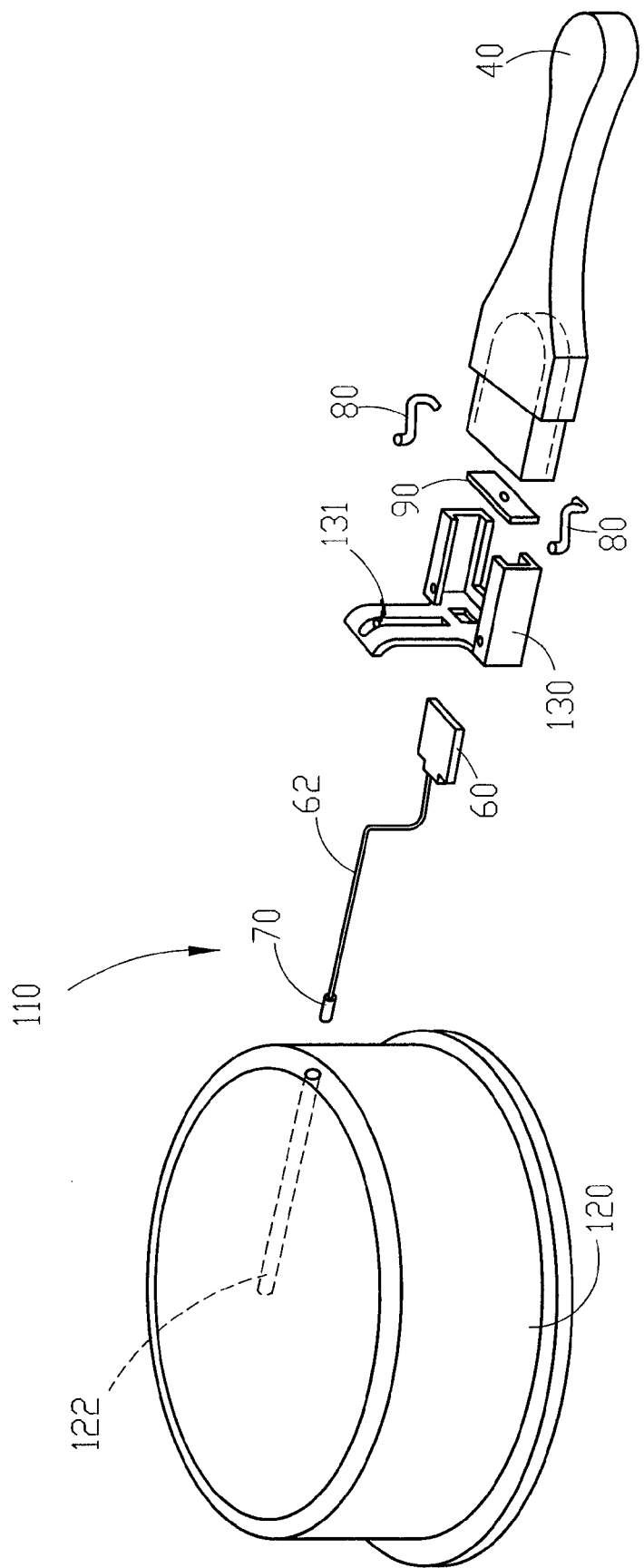
FIG. 12 is an exploded perspective view of a RFID controlled frying pan of the instant invention in which a temperature sensor is positioned at the center of the base of the pan through the use of a tunnel extending into the base of the pan.

Referring to FIG. 12, an exploded, bottom perspective view of a pan, 110, similar to that presented in FIG. 9, is shown in which tunnel 122 extends to the center of the base of pan body 120. As discussed above with respect to FIG. 9, pan 110 includes handle 40 connected to pan body 120 via bracket/receiver 130. Spring clips 80 releasably secure handle 40 to receiver 130. RFID tag, 60, is connected to temperature sensor 70 via wires, 72, and RFID tag 60 is stored in a cavity located within handle 40. Gasket 90 is located between receiver 130 and handle 40. In a preferred embodiment, tunnel 122 is drilled into the base of pan body 120 after pan body 120 has been manufactured. In this manner, a wide variety of preexisting pan bodies can be utilized without the need of special manufacturing processes for those bodies.

FIGS. 13 and 14 show detailed views of an embodiment of receiver 130, 230 that can be used with any of the tunnel (110) or slab-bottom (220) pans discussed herein. Receiver 130, 230 is manufactured, operates, and is assembled to pan body 120, 220 in the same or similar manner as that of receiver 30 discussed above. Receiver 130, 230 shall now be described wherein like numbers (i.e. 30, 130, 230) represent similar components to those of receiver 30. Receiver 130, 230 includes opposing support members 136, 236 for engaging the handle, and window 137, 237 located between opposing support members 136, 236. Receiver 130, 230 also includes lateral member 139, 239 extending downward from support members 136, 236 to the base of pan body 120, 220. Channel 138, 238 is formed in member 139, 239 to permit wires 62 to pass through the cavity created between member 139, 239 of receiver 130, 230 and pan body 120, 220. Lateral member 139, 239 includes an end tab, 133, 233, that engages with a notch in the pan body or the bottom slab to provide a clean, generally flush base for the assembled combination of pan body 120, 220 and receiver 130, 230. The inclusion of end tab 133, 233 for insertion into a notch located within the pan body, eliminates the need for locator recess 33 and the associated locator discussed above with respect to receiver 30, as the combination of end tab 133, 233 and the notch in the pan body will ensure proper assembly. As with receiver 30, receiver 130, 230 includes nubs 135, 235 for use in an automated welding/braising assembly process. Receiver 130, 230 further includes injection port 131, 231 near the bottom of lateral member 139, 239 for insertion of a needle or injector. Injection port 131, 231, which is not present in receiver 30, allows for the injection of a silicone potting material, such as Loctite® 5406, to be injected into the tunnel or between the pan body and attached slab, protecting the internal layers of the pan and/or slab and securing the temperature sensor in position.

Although end tab 133, 233 shown in FIGS. 13 and 14 includes a generally central tab extending beyond the sides of end tab 133, 233 (as can be seen in FIG. 11), it will be appreciated that end tab 133, 233 can be of any number of shapes and sizes to mate with a corresponding notch in the pan body. For example, FIGS. 15 and 16 show an embodiment of receiver 130 for insertion into notch 124 of pan body 120 wherein end tab 133 of receiver 130 is generally flat. As is shown in FIG. 15, notch 124 is cut, machined or drilled into the perimeter surface of pan body 120 at the end of tunnel 122. Although tunnel 122 shown in FIG. 15 is generally cylindrical, it will be appreciated that the shape of the tunnel may vary depending upon the shape of the temperature sensor. End tab 133 of receiver 130 mates with notch 124 in pan body 120 to form a generally flush connection between pan body 120 and receiver 130. Injection port 131 in receiver 130 allows for insertion of a needle for injecting a potting material into tunnel 122 once receiver 130 has been assembled to pan body 120.

FIG. 17 shows a partial section view of pan 110 presented in FIG. 12 fully assembled. As is shown in FIG. 17, the diameter of tunnel 122 is slightly larger than that of temperature sensor 70. In addition the total diameter of wires 62 is less than the diameter of temperature sensor 70. This provides enough space for insertion of a needle into tunnel 122 when receiver 130 is assembled to pan body 120 and temperature sensor 70 and associated wires 62 are located in tunnel 122. The needle is inserted into tunnel 122 through injection port 131 located at the base of lateral member 139 of receiver 130. As the potting material fills tunnel 122, and surrounds temperature sensor 70 and wire 62, the needle is removed and injection port 131 is closed using a Laser, tig, or similar welding process.

Pan body 120 shown in FIG. 17 is constructed of a 5 ply material as discussed above. The layers of pan body 120 may however be thicker than those discussed above with respect to pan body 20, to allow temperature sensor 70 to be fully imbedded within pan body 120. Tunnel 122 is located within the aluminum core (the three internal layers of the pan body) so that temperature sensor 70 is in contact with the aluminum core. In addition, the stainless steel layers (the two surface layers) are laminated on both sides of each layer to provide better corrosion protection from possible exposure caused by tunnel 122 extending into pan body 120 from its exterior.

Referring to FIG. 18, an exploded, bottom perspective view of a pan, 210, similar to that presented in FIG. 9, is shown in which slot 222 is milled between the center of the base of pan body 220 to the perimeter of the base of pan body 220. Pan 210 includes a thin slab, 226, made of stainless steel (although a combination of aluminum and stainless steel layers, or any other suitable material can be utilized in alternative embodiments), which is attached to the bottom of pan body 220. Slab 226 is braised to the bottom of pan body 220 using a suitable solder, such as an 1170 melt solder. Although not shown in FIG. 18, pan 210 includes handle 40 connected to pan body 220 via bracket/receiver 230. Spring clips 80 releasably secure handle 40 to receiver 230. RFID tag, 60, is connected to temperature sensor 70 via wires, 72, and RFID tag 60 is stored in a cavity located within handle 40. Gasket 90 is located between receiver 230 and handle 40. In a preferred embodiment, slot 222 is machined into the base of pan body 220 after pan body 220 has been manufactured. In this manner, a wide variety of preexisting pan bodies can be utilized without the need of special manufacturing processes for those bodies. In another preferred embodiment, pan body 220 is of 5 ply construction, as discussed above. In this embodiment, slot 222 is milled into pan body 220 so that sensor 70 is placed in contact with the aluminum core of pan body 220.

FIGS. 19 through 23 show several variations of a second embodiment of pan 210 having a slab attached to the bottom of pan body 220, in which slot 222 is formed in slab 226 instead of being milled in pan body 220. Locating slot 222 within slab 226 allows for a thinner wall thickness for pan body 220, and eliminates the need to perform any machining operations on pan body 220 once the body is manufactured (other than braising slab 226 to pan body 220). In a preferred embodiment of the slab base pan having a slot formed within the slab, slab 226 is constructed of an aluminum layer (or aluminum alloy) and a steel layer (although any other suitable material can be utilized for slab 226 depending upon the conductive, inductive and various other properties desired). Slot 222 is formed in the aluminum layer to position temperature sensor 70 in contact with the heat conductive aluminum to provide a more accurate temperature reading. The steel layer is positioned opposite the side of slab 226 that contacts pan body 220 to provide a durable, attractive finish to pan 210. In addition, the steel layer can be heated by induction if pan 210 is used on an induction stove-top.

FIG. 19 shows a partial section view of slab-bottom pan 210 fully assembled having a generally rectangular slot formed in the slab. As is shown in FIG. 19, the height and width of slot 222 milled into slab 226 is slightly larger than that of temperature sensor 70. In addition the total height and width of wires 62 is less than the height and width of temperature sensor 70. This provides enough space for insertion of needle 300 into slot 222 when receiver 230 is assembled to pan body 220 and temperature sensor 70 and associated wires 62 are located in slot 222. Needle 300 is inserted into slot 222 through injection port 231 located at the bottom of lateral member 239 of receiver 230. As the potting material fills slot 222, and surrounds temperature sensor 70 and wires 62, needle 300 is removed and injection port 231 is closed using a Laser, tig, or similar welding process.

The bottom of lateral member 239 of receiver 230 includes tab 233 that fits within slot 222 of slab 226. As is shown in FIG. 19, the bottom of lateral member 239 extends below tab 233 slightly less than the thickness of slab 226 existing below tunnel 222 to provide a generally flush bottom connection between slab 226 and receiver 230. Gap 225 is positioned between the bottom of lateral member 239 of receiver 230 and slab 226 to allow for thermal expansion and contraction to slab 226 and receiver 230 during heating and cooling of pan 210.

FIG. 20 shows a partial section view of slab-bottom pan 210 fully assembled including a generally rectangular slot formed in the slab and a temperature sensor rod attached to receiver 230. Rod 310 is a rigid member that connects sensor 70 to receiver 230 for easier insertion of sensor 70 into pan body 220 during assembly. As is shown in FIG. 20, the height and width of slot 222 milled into slab 226 is slightly larger than that of temperature sensor 70. In addition the total height and width of wires 62 and rod 310 is less than the height and width of slot 222, allowing wires 62, rod 310 and sensor 70 to all fit within slot 222. Micro hole 228 is included at the bottom of slab 226 extending into slot 222. Micro hole 228 allows for the injection of a potting material into slot 222 which surrounds temperature sensor 70 and wires 62. Once the potting material is injected into slot 222, micro hole 228 is closed using a Laser, tig, or similar welding process.

FIG. 21 shows a bottom perspective view of receiver 230 presented in FIG. 20. The bottom of lateral member 239 of receiver 230 includes tab 233 that fits within slot 222 of slab 226. As is shown in FIG. 21 (and FIG. 20), the bottom of lateral member 239 extends below tab 233 slightly less than the thickness of slab 226 existing below tunnel 222 to provide a generally flush bottom connection between slab 226 and receiver 230. Gap 225 is positioned between the bottom of lateral member 239 of receiver 230 and slab 226 to allow for thermal expansion and contraction to slab 226 and receiver 230 during heating and cooling of pan 210. Rod 310 is positioned within hole 315 located within tab 233. Wire channels 238a and 238b are included in tab 233 for wires 62 to extend from wire channel 238 of receiver 230 into slot 222.

FIG. 22 shows a partial section view of slab-bottom pan 210 fully assembled including a generally cylindrical slot formed in the slab and an insertable tube attached to receiver 230. Tube 320 is a rigid member connected to receiver 230 into which sensor 70 is inserted for easier insertion of sensor 70 into pan body 220 during assembly. Tube 320 surrounds sensor 70 and wires 62, with the end of sensor 70 extending beyond tube 320. As is shown in FIG. 22, the diameter of slot 222 formed into slab 226 is slightly larger than that of tube 320, allowing wires 62, and sensor 70, located within tube 320, to all fit within slot 222. Hole 228 is included at the bottom of slab 226 extending into slot 222 just in front of the end of tube 320. Hole 228 allows for the injection of a potting material into slot 222 which surrounds temperature sensor 70 and tube 320. Once the potting material is injected into slot 222, hole 228 is closed using a Laser, tig, or similar welding process. Receiver 230 also includes injection port 231 for injecting potting material into tube 320. The total diameter of wires 62 is less than the diameter of tube 230. This provides enough space for insertion of needle 300 into tube 320 when receiver 230 is assembled to pan body 220 and tube 320, temperature sensor 70 and associated wires 62 are located in slot 222. Needle 300 is inserted into tube 320 through injection port 231 located at the bottom of lateral member 239 of receiver 230. As the potting material fills tube 320, and surrounds wires 62, needle 300 is removed and injection port 231 is closed using a Laser, tig, or similar welding process.

Figure 23:
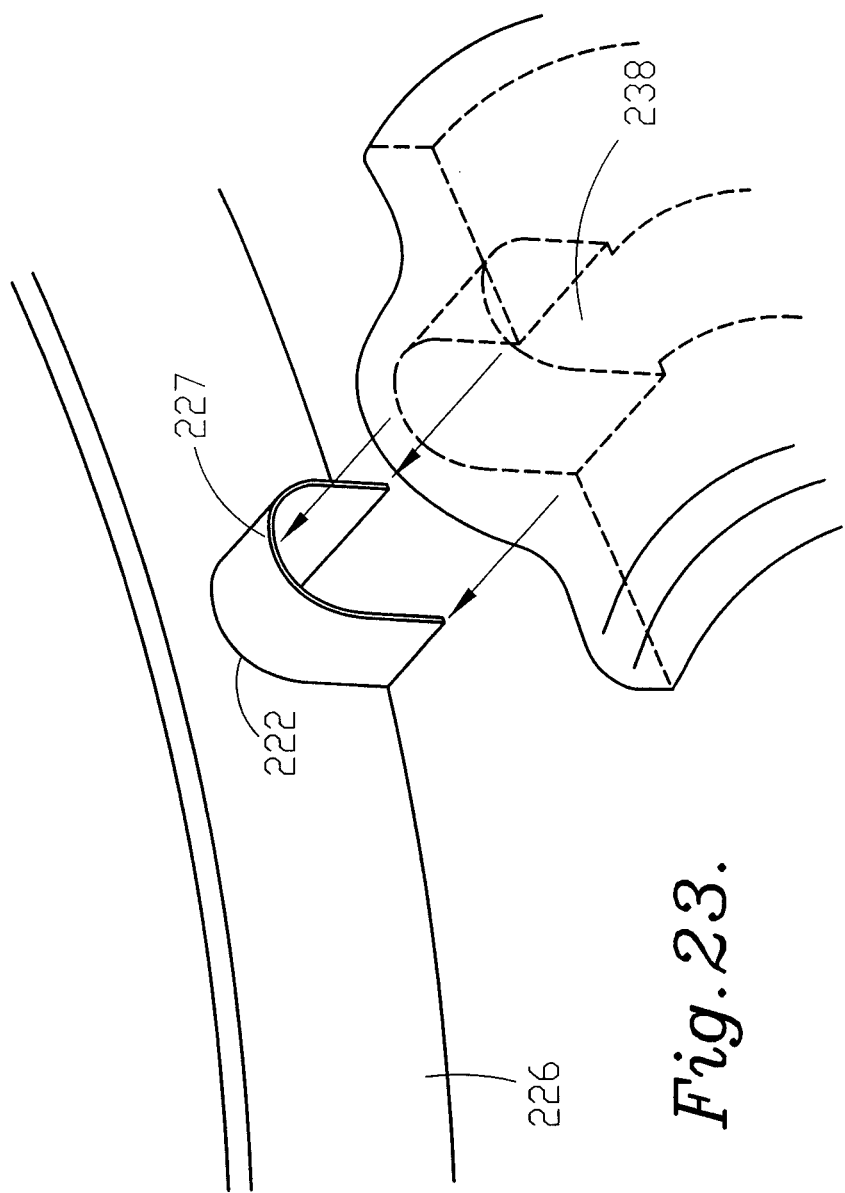
FIG. 23 is a partial perspective view of a second embodiment of a slab bottom pan having a slot in the slab, showing another alternative embodiment for a receiver and a stamped-tunnel slot.

FIG. 23 shows an alternative embodiment of slab-bottom pan 210 including a tunnel formed in slab 226. A stamped stainless steel tunnel, 227, is positioned in slot 222 of slab 226. Tunnel 227 protrudes from the outer perimeter of slab 226 for engagement with wire channel 238 of receiver 230.

Once the temperature controllable objects discussed above (either 10, 110, or 210) have been manufactured an assembled, the RFID tags are initialized and control algorithms and data are downloaded to the tags. The control algorithms and data can include such information as the class of the object, i.e. sauce pan, frying pan, serving tray, warming dish, etc. In addition, information regarding the location of the temperature sensor can be included (i.e. side notch, bottom center, etc.) for use in determining ideal cooking temperatures. Heating characteristics, such as conductivity of the materials of the object, thickness, number of layers, etc., can also be downloaded to the tag, or alternatively these characteristics can be used in determining the class of the object.

It will be appreciated that components from any of the embodiments of heatable objects discussed above can be interchanged with similar components of any of the other embodiments of heatable objects discussed herein. For example, the insert rod or insertable tube receivers discussed in connection with pans 210 could be utilized in connection with pans 110. Likewise, handles 40, 140, 50, and 150, as well as silicone gasket 90, and handle mounting hardware, can be interchangeably utilized on any of pans 10, 110, and 210. In addition, the methods of manufacturing and locating the temperatures sensors (i.e. side-notch 10, tunnel-bottom 110, or bottom-slab 210) can be interchangeably utilized with any of the various pots and pans discussed an shown herein, as well as in any cookware, servingware or other heatable objects now known or later discovered.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to exemplary embodiments, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letter Patent is as follows:

1. A radio frequency identification controlled object comprising:
 a temperature sensor placed in contact with a heatable portion of the object; and
 a radio frequency identification tag associated with said temperature sensor and located outside of a heat-generation zone for the object, said tag being operable to communicate temperature information obtained by said temperature sensor with a heating device,
 wherein said temperature sensor is at least partially imbedded in a tunnel in said heatable portion of the object.

2. The radio frequency identification controlled object as claimed in claim 1 wherein said temperature sensor is placed in contact with a primary heat-distribution layer of said heatable portion of the object.

3. The radio frequency identification controlled object as claimed in claim 2 wherein said primary heat-distribution layer comprises an aluminum core for the object.

4. The radio frequency identification controlled object as claimed in claim 3 wherein said heatable portion of the object further comprises a ferromagnetic layer associated with said aluminum core.

5. The radio frequency identification controlled object as claimed in claim 1 wherein said heatable portion of the object comprises a primary base portion and a slab attached to a surface of said primary base portion, and wherein said temperature sensor is located between said primary base portion and said slab.

6. The radio frequency identification controlled object as claimed in claim 5 wherein the tunnel in which said temperature sensor is located is formed between said base portion and said slab of the object.

7. The radio frequency identification controlled object as claimed in claim 1 wherein said heatable portion of the object is heated by magnetic induction.

8. The radio frequency identification controlled object as claimed in claim 1 wherein said radio frequency identification tag is located within a handle of the object.

9. The radio frequency identification controlled object as claimed in claim 1 wherein the object comprises a cookware object.

10. The radio frequency identification controlled object as claimed in claim 1 wherein the object comprises a servingware object.

11. A radio frequency identification controlled object comprising:
- a temperature sensor at least partially imbedded within a heatable portion of the object; and
- a radio frequency identification tag associated with said temperature sensor, said tag being operable to communicate temperature information obtained by said temperature sensor to a heating device,
- wherein said temperature sensor is at least partially imbedded within a notch in said heatable portion of the object.

12. The radio frequency identification controlled object as claimed in claim 11 wherein said radio frequency identification tag is located remote from said heatable portion of the object.

13. The radio frequency identification controlled object as claimed in claim 11 wherein said heatable portion of the object comprises a primary base portion and a slab attached to a surface of said primary base portion, and wherein said temperature sensor is located between said primary base portion and said slab.

14. The radio frequency identification controlled object as claimed in claim 13 wherein the notch in which said temperature sensor is located is formed in said base portion of the object.

15. The radio frequency identification controlled object as claimed in claim 13 wherein the notch in which said temperature sensor is located is formed in said slab.

16. The radio frequency identification controlled object as claimed in claim 11 wherein said heatable portion of the object is heated by magnetic induction.

17. The radio frequency identification controlled object as claimed in claim 11 wherein said radio frequency identification tag is located within a handle of the object.

18. The radio frequency identification controlled object as claimed in claim 11 wherein the object comprises a cookware object.

19. The radio frequency identification controlled object as claimed in claim 11 wherein the object comprises a servingware object.

* * * * *